March 19, 1957 G. M. GLIDDEN 2,785,767
RECOVERY AND FILTERING APPARATUS AND METHOD
Filed Feb. 25, 1953 2 Sheets-Sheet 2
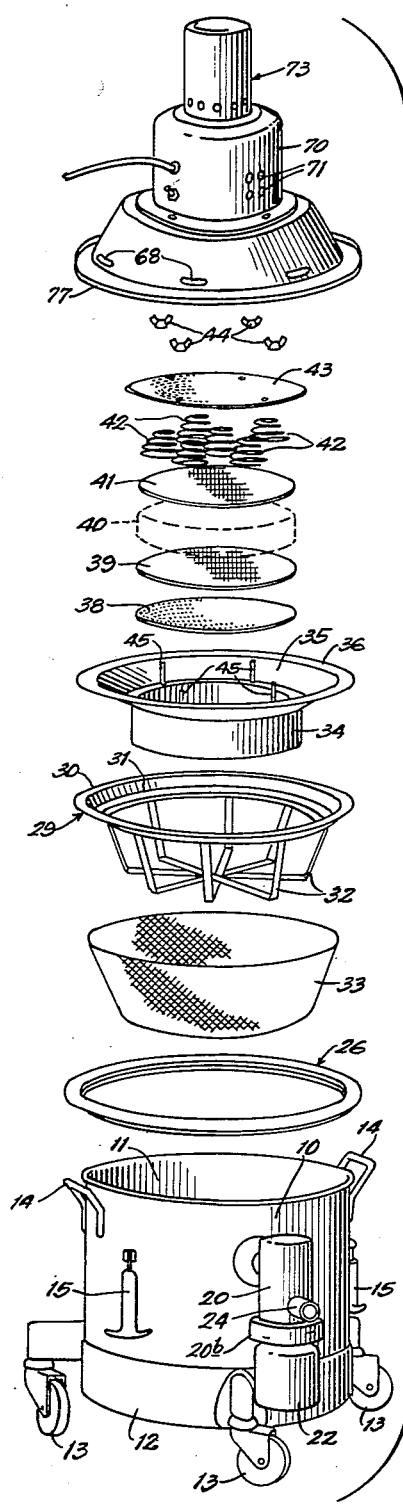
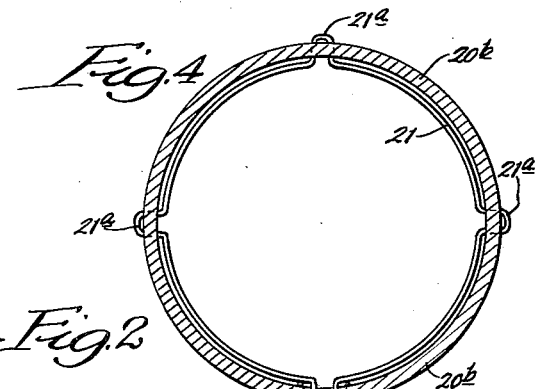
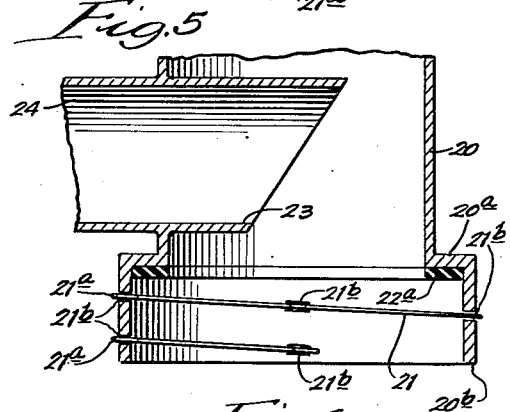
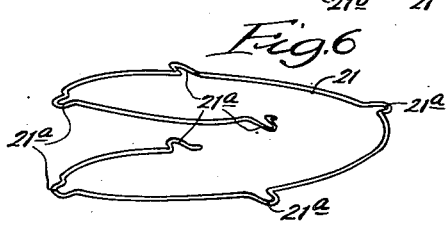
INVENTOR.
Galen M. Glidden,
BY
Dawson, Tilton & Graham,
ATTORNEYS.

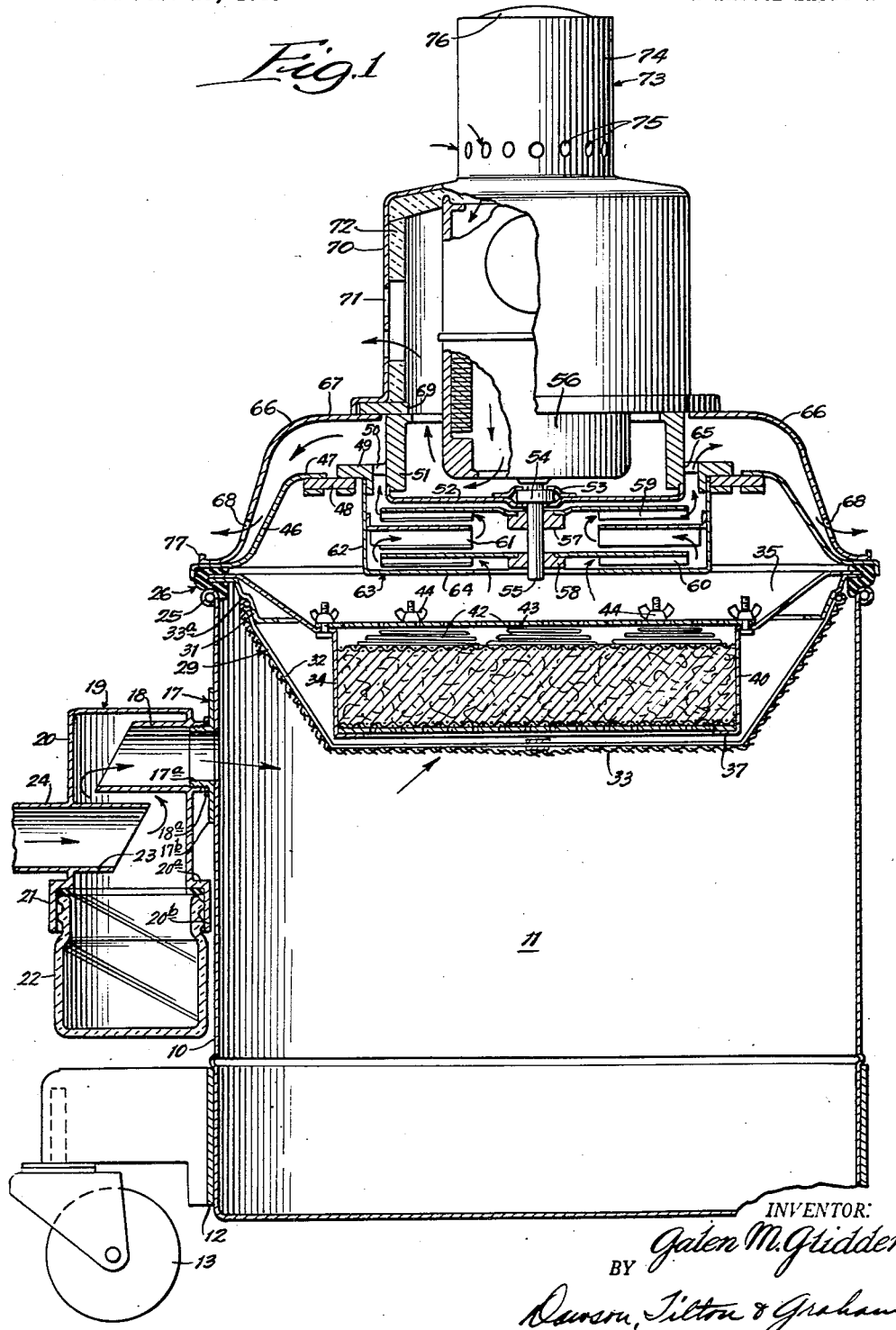

United States Patent Office 2,785,767
Patented Mar. 19, 1957

2,785,767

RECOVERY AND FILTERING APPARATUS AND METHOD

Galen M. Glidden, Wheaton, Ill., assignor to Acme Protection Equipment Company, Chicago, Ill., a partnership Application February 25, 1953, Serial No. 338,638

2 Claims. (Cl. 183—37)

This invention relates to a recovery and filtering apparatus and method, and has especial utility in the recovery of noxious particulate material such as mercury drops in a directly usable form without putting mercury particles or vapor into the surrounding air and while purging the air of mercury vapor.

Liquid mercury is used extensively in commercial processes, as for example the making of mercury thermometers, instruments, and in medicinal applications. It is a characteristic of such operations that mercury spillage onto the floors and tables, etc., is always present. The spillage is undesirable because it has heretofore resulted in the waste of the spilled mercury. Further, mercury is a relatively volatile material and when a small spill at room temperature is viewed by means of ultraviolet light and fluorescent screen the evaporation of mercury looks much like the smoke from a lighted cigarette held in the fingers. The vaporization is progressively greater as the temperature increases from the freezing point of mercury (negative 38° F.) to a temperature of 674.4° F. The equilibrium concentration at room temperature of 77° F. is over twenty milligrams per cubic meter and is double this amount at 93° F. The generally accepted maximum allowable concentration is 0.1 milligram of mercury per cubic meter of air, and it is seen therefore that mercury spillage must be quickly removed so that the maximum allowable concentration of mercury in the air is not exceeded. The removal of the mercury spillage is a matter of health, since mercury is noxious or harmful to humans. In acute cases of mercury poisoning, death has occurred.

Heretofore mercury spillage has been controlled by reducing the rapid production of vapor by spreading flowers of sulphur on the spill. This has been followed by a cleanup and disposal of the sludge. This procedure is undesirable in that mercury is expensive and the spillage is lost. In addition, the mercury sludge formed with the flowers of sulphur has to be handled during its disposal, which further increases the hazards to those disposing of the spillage. There has been a need for a better means of clearing areas of mercury spillage, while concurrent with this need is the desirability of providing therewith a means or method for recovering the spilled mercury in usable form.

It is therefore an object of this invention to provide apparatus and a method of recovering noxious material such as mercury spillage and to do so with safety to personnel. Another object of the invention is to clear an area of mercury spillage while at the same time recovering the mercury in a form ready for immediate reuse. Still another object of the invention is to recover mercury spillage while preventing mercury particles and mercury vapor from getting into the air as a result of ;the recovery process. A further object of the invention is the recovery of mercury spillage in usable form and at the same time the purging of the surrounding air of mercury vapor. Yet a further object is that of recovering mercury spillage by using air from the surrounding atmosphere in combination with a suction device while purging the air of mercury vapor by means of filters. Additional objects and advantages of the invention will appear as the specification proceeds.

An embodiment of my invention is illustrated in the accompanying drawings, in which—

Figure 1 is a vertical sectional view taken through the center of the apparatus; Fig. 2 is a perspective view of the various parts of the apparatus in spaced-apart relation and in the order of their assembly; Fig. 3 is a cross-sectional view of the retainer and gasket; Fig. 4 is a transverse sectional view of the threaded portion of the filter trap; Fig. 5 is a broken vertical sectional view of the threaded portion of the trap; and Fig. 6 is a perspective view of the snap-in threads.

It is seen in both Figs. 1 and 2 that my apparatus includes a container or body member 10 providing a chamber 11 therein. The container or casing 10 is equipped with a castor frame 12 carrying a plurality of spaced castors 13. At its upper end the casing 10 is equipped with a pair of handles 14 and in addition has pivotally mounted thereon hood clamps 15 that are used for securing the upper structure, that will be later described, upon the casing 10. The clamps 15 are well known and since they are conventional it is believed that a detailed discussion of these members is not necessary.

The side wall of the casing 10 is equipped with an inlet opening 16 having mounted thereabout an outwardly-extending connector member 17 equipped with a threaded portion 17a and an annular flange 17b secured to the side wall of the casing and providing a substantially air tight connection therewith. A pipe or conduit 18 having a threaded end portion is threadedly received upon the connector portion 17a and a gasket 18a provides a fluid tight seal therebetween. Mounted upon the pipe 18 is a trap 19 that comprises a casing structure 20 having an opening at the lower end thereof and being provided with a laterally or outwardly extending wall 20a about the opening and a peripheral wall 20b depending from the wall 20a. The enlarged opening thus provided is equipped with threads 21 adapted to receive the threaded neck of a jar or receptacle 22. The receptacle 22 may be, if desired, transparent so that the contents thereof are readily visible from the outside.

I prefer that the threads 21 be of a snap-in type construction so that they may be inserted into the end of casing 20 within the depending wall 20b after the trap has been fabricated and treated. The treatment, for example, may consist of porcelainizing the entire structure. The circular or helical wire thread illustrated best in Figs. 4 through 6 is suitable for this purpose and is equipped with outwardly-extending spaced-apart ears 21a that extend through appropriate apertures 21b in the peripheral wall 20b. The ears support the thread and also provide appropriate support for a receptacle received therein. A gasket 22a is provided to seal the receptacle to the outwardly-extending wall 20a and thereby provide a fluid tight seal with the trap 19. I have found that in the operation of my device, as will be hereinafter described, the vacuum or negative pressure within the casing 20 and receptacle 22 draws the receptacle tightly against the gasket 22a and provides a fluid seal between the wall 20a and receptacle 22. A simple thread arrangement for supporting the receptacle will therefore suffice and the yieldability of the wire 21 or the vertical movement of the wire permitted by the loose fit of the ears 21a within the apertures 21b readily allow the receptacle to be drawn upwardly by the vacuum within the trap.

The trap 19 is provided with an inlet opening 23 through the side wall thereof that is spaced slightly below the outlet opening 16, and rigidly mounted in the opening 23 is a pipe or conduit 24 having extended portions that enter the trap. Together the portions of the tubular conduits 18 and 24 that extend into the trap 19 form arcuate or curved baffles that deflect air flowing through the trap and provide a tortuous path that the air must follow. Both the pipe or conduit 18 and the conduit 24 may be welded to the casing portion 20 of the trap so that an air tight fitting between the conduits and the trap is attained.

The upper end of the casing 10 is open and the upper edge of the casing walls is rolled outwardly to provide an annular support 25 upon which is mounted a resilient retaining gasket 26. The gasket 26 may be made of rubber or some other similar material. As seen best in Fig. 3, the gasket 26 is provided with an annular recess 27 extending thereabout and an annular flange 28 that extends downwardly from the main portion of the gasket. The annular flange 28 has an outer diameter substantially equal to the inner diameter of the cylindrical casing 10 and fits snugly therein.

A filter frame 29 is equipped at its upper end with a laterally extending annular flange 30 that is received within the recess 27 provided by the gasket 26 and is supported thereby in depending relation within the chamber 11. The filter frame 29 is substantially open, with the exception of the flange 30 and ring portion 31 formed integrally therewith, but is provided with a plurality of spaced apart U-shaped support members 32 that are adapted to receive thereon a particle filter 33. Preferably the particle filter 33 is a porous acid-resistant fabric and preferably a dustless fabric such as Dynel. The fabric filter 33 may be supported upon a wire frame 33a that is preferably made of stainless steel, while the filter frame 29 is preferably porcelain enamel, although it may also be stainless steel or other non-corrosive material. The diameter of the upper edge of the filter 33 and the wire support therefor may be such that it tightly engages the outer surface of the imperforate portion 31 of the filter frame above the U-shaped members 32 and is drawn tightly thereover. The ends of the wire 33a may be twisted to tighten the fabric about the frame 29.

A canister 34 that is preferably of stainless steel is equipped at its upper end with an outwardly inclined frusto-conical portion 35 having formed integrally therewith a laterally extending flange 36 that is received within the recess 27 of the gasket 26. The bottom of the canister 34 is provided with an inwardly extending support or ring 37 but is otherwise open throughout the entire bottom area.

Within the canister 34 and resting upon the inwardly extending support 37 is a plate 38 equipped throughout with a plurality of apertures so that the plate offers little resistance to the flow of air therethrough. Resting upon the plate 38 is a wire screen 39 that may be of about No. 12 mesh. A filter material 40 is received upon the wire screen 39 and is retained within the canister 34 by the side walls thereof. Above the filter material 40 is a second wire screen 41 that is identical with the screen 39. A plurality of coil springs 42 are supported upon the upper surface of the screen 41 and in turn support an upper perforated plate 43 that is somewhat larger in diameter than the lower plate 38. The plates, screens, filter material and springs are held within the canister 34 by means of wing nuts 44 that are received upon threaded studs 45 with which the canister is equipped. The studs 45 may be welded or otherwise secured in place and are spaced about the canister and extend upwardly therefrom and through spaced apertures adjacent the periphery of the upper plate 43. The nuts 44 draw the plate 43 tightly against the canister 34. This structure is effective to compress the filter material 40 within the canister and between the wire screens. The perforated plates 38 and 43, the screens 39 and 41, springs 42, wing nuts 44 and studs 45 are preferably all made of stainless steel and the canister 34 is porcelain enamel or other non-corrosive material. This material is particularly acid-resistant and resists amalgamation with mercury. The filter material 40 is preferably material that will trap mercury vapor and free air passing through the filter from mercury vapor. I prefer to use manganese dioxide impregnated with copper, which is sold and is known by the trade name Hopcalite. This material is granular and is highly porous and presents a very large area while being slowly penetrated by mercury vapor. The structure described provides for the ready removal of the granular filter material 40 from the canister and this is desirable since periodic replacement is needed. I have found that after about 40 hours of operating my apparatus for recovering and filtering the air of mercury vapor, it is desirable to replace the filter material 40. The length of time that the filter material is effective to remove mercury vapor from the air will of course depend upon the concentration of mercury vapor in the air. Where the concentration is fairly heavy I have found that 40 hours is a reasonable time for operation of the apparatus before changing the filter material.

Supported upon the upper surface of the gasket 26 is an annular support member 46 that extends upwardly and inwardly and terminates in a substantially horizontal ring portion 47. Rigidly secured to the horizontal portion 47 is an annular ring support 48 that rigidly carries at its inner side a circular channel support 49. The channel support is extended inwardly at 50 and the inward extension is rigidly attached to a cylindrical vertical support member 51. Depending from the vertical support member 51 and extending thereacross to substantially seal the member is a shield 52 equipped centrally with an aperture and having an inner bifurcated edge 53. Mounted within the spaced legs of the bifurcated edge 53 is a bearing 54 that rotatably supports the shaft 55 of a motor 56. The shaft 55 extends downwardly through the bearing 54 and is equipped with a pair of spaced hubs 57 and 58 that are provided respectively with blades 59 and 60 forming a centrifugal fan that is effective to suck air upwardly through the filter members. The blades 59 and 60 are spaced apart, and interposed therebetween are stationary blades 61 rigidly carried by the downwardly extending wall 62 of a cover frame 63. The wall 62 is mounted upon the channel member 49. Formed integrally with the wall 62 is an inwardly extending plate 64 that terminates at its inner end adjacent the inner ends of the blades 60 and at a spaced distance from the hub 58. Thus, air drawn by the centrifugal fan through the filter unit flows upwardly through the central aperture of the member 64 and is forced by the rotating and stationary blades between the walls 62 and the shield 52 and upwardly through apertures 65 provided through the member 50.

A cover 66 secured at its lower end to the member 46 extends upwardly therefrom and in spaced relation therewith and terminates in a substantially horizontal portion 67 providing an annular opening therethrough. The upwardly and inwardly inclined walls of the member 66 are provided with a plurality of spaced apertures 68 through which the air forced through the fan and through the apertures 65 must flow to be discharged to the atmosphere. A ring member 69 is secured to the wall 51 and to the cover 66. Both the cover 66 and the inner member 46 are of relatively rigid material and together and in combination with the wall 51 support the motor 56.

A cover 70 equipped with a plurality of spaced discharge ports 71 is provided on its inner surface with a felt liner 72. The cover 70 encloses the upper portion of the motor 56 that extends vertically above the member 66 and the cover 70 may be secured in position upon the ring 69 by cap screws or other comparable securing means (not shown). Suitable struts or other well known arrangements may be provided to stabilize the motor 56 and render the entire structure as rigid as desired. Extending vertically above the cover 70 is a timer unit designated generally by the numeral 73. The timer mechanism is enclosed by a casing 74 that is provided adjacent its lower edge with a plurality of spaced apart apertures 75 suitable for the passage of air therethrough.

Any of the numerous and well known timing devices may be utilized to indicate the length of time that my apparatus is in actual operation. Preferably I employ a type of counter that is connected to the motor 56 and includes a dial 76 that indicates the total operating time numerically. Thus, by glancing at the dial 76 the operator knows the exact time that the apparatus has been in operation and when the filter material 40 has been in the machine for about 40 operating hours the workman will know that it is time to change the filter material. If desired, a dual reading may be provided; one reading will show the total operating time, while the second dial is adjustable so that it may be set to zero when a new filter material has been placed in the apparatus. Such devices are numerous and well known and a detailed showing and description are believed unnecessary.

Since the recovery and filtering apparatus may be used for the recovery of mercury, it is desirable that the air used to pick up mercury droplets or particles and which will have a relatively high mercury vapor content not be drawn through the motor for the cooling thereof, the reason for this being that mercury drawn through the hot motor would readily amalgamate with the motor parts and quickly cause a deterioration thereof. Therefore I have sealed the motor 56 from the lower structure by means of the closure member or shield 52 as previously described. To provide for cooling of the motor 56 a separate fan (not shown) is secured to the motor shaft 55 and serves to draw air through the apertures 75, through the motor, and to discharge the air through the apertures or discharge ports 71 in the side wall of the casing or cover 70.

*Operation*

After the filter material 40 has been placed between the screens and plates in the canister 34 and secured therein as previously described, and the canister and fabric filter 33 are supported within the casing 10 by the gasket 26, the upper motor and fan assembly is placed upon the gasket 26 as illustrated in Fig. 1 and the clamps or fasteners 15 are pivoted upwardly and drawn over the edge of the cover 66 which is equipped with an annular ring 77 to hold the fasteners 15 in position. The entire assembly thus provides a sealed unit and is ready for operation. A removable jar 22 is threaded into place to complete the trap 19 and upon the placing of suitable hoses and pickup tools, which are conventional and not shown, upon the outer end of the pipe 24 the motor 56 may be actuated by means of the usual on-off switch. Though conventional in a design sense, the tools, etc., are made of plastic or other material that does not amalgamate with mercury.

The fan blades 59 and 60 are rotated rapidly by the motor 56 and air is drawn through the pickup tools and hoses and is sucked into the trap 19. The heavier mercury particles or droplets will impinge upon the side walls of the trap, and further, because of the baffle arrangement resulting in a change in direction of the air flow, the heavier or larger particles will drop from the air stream and into the receptacle 22. The air stream will then pass through the pipe 18 and into the chamber 11 provided by the casing 10, where it will be drawn upwardly through the fabric filter 33. Any remaining large mercury particles and those being smaller in size will be intercepted by the fabric filter 33 and will cling thereto or will drop to the bottom of the chamber 11.

The air will be drawn upwardly through the filter material 40 by the centrifugal fans 59 and 60 and the filter material will remove mercury vapor from the air passing therethrough. The air will be expelled through the apertures 65 and finally through the apertures 68 and into the atmosphere in substantially mercury-free condition. These operations are continued until the area is clear of mercury spillage, and may be repeated as often as is necessary to remove mercury spillage from the floors, tables, etc. After about 40 hours of operation the filter material 40 should be changed to insure the discharge of mercury-free air.

As a safeguard, the apparatus may be operated continuously with the pickup tubes removed. In such case, room air is sucked through the pipes 24 and 17 as previously described and the air purged of mercury vapor and discharged back into the atmosphere through the apertures 68. Continuous operation in this manner may be advantageous where the concentration of mercury is particularly heavy and because of the evaporation of mercury as previously set out which soon renders the air unsuitable and noxious.

The mercury particles collected in the receptacle 22 are substantially free of contamination and may be immediately reused. If desired, the receptacle may be removed and capped for storage, or the mercury poured therefrom and into the usual storage containers.

Changing of the filter material 40 presents no problem, since the fasteners 15 may be released and the upper motor and fan assembly lifted from the gasket 26. The wing nuts 44 are then released and the upper plate 43 and wire screen 41 together with the springs 42 can be lifted from the filter material. If desired, the entire canister and fabric filter unit 33 can be lifted by means of the gasket 26 and the filter material 40 poured therefrom into suitable discard containers. The fabric filter 33 can also be replaced at the same time. The canister is then refilled and the upper plate and screen secured in place by the wing nuts, while the springs compress the granular particles.

It will be apparent from the foregoing discussion that in addition to the apparatus described my invention includes the method of recovering mercury droplets and filtering the air. In the method a stream of air is maintained and the stream is passed over mercury particles, whereby the particles are picked up by the air stream. The air stream with the particles therein is passed through a devious path that is effective to remove the larger particles or droplets of mercury from the air stream. Subsequently the stream is passed through a filter that further removes mercury particles from the air and is also effective for removing mercury vapor from the air. The filtered air is then discharged.

While in the foregoing specification I have set forth an embodiment of my invention in substantial detail for purposes of illustration, it will be apparent to those skilled in the art that changes may be made in the details without departing from the spirit of the invention.

I claim:

1. Apparatus adapted to recover mercury spillage by means of air pickup and adapted to filter mercury vapor from the air, comprising a cylindrical casing providing a chamber therein and having an enlarged discharge opening in the top thereof, said casing having also an inlet opening in a wall thereof, a trap for collecting mercury particles and having an outlet port in open communication with said chamber through said inlet opening, said trap providing an inlet port and being equipped with curved baffles interposed between the inlet and outlet ports, a particle filter extending across said discharge opening and depending therefrom, a canister mounted above said particle filter and being enclosed thereby, said canister being open at its bottom and having mounted thereon a bifurcated plate, a screen above said plate, filter material consisting of granular particles above said screen, a second screen above said filter material, plate and securing means for holding said filter material within said canister, and suction means for drawing air through said trap, chamber and filters.

2. The structure of claim 1, in which a pair of tubular conduits extend into said trap through the inlet and outlet ports thereof, and in which said curved baffles are provided by the end portions of said tubular conduits within said trap.

References Cited in the file of this patent

UNITED STATES PATENTS

| | | |
|---|---|---|
| 955,886 | Laughlin | Apr. 26, 1910 |
| 1,315,424 | Schies | Sept. 9, 1919 |
| 1,422,211 | Lamb | July 11, 1922 |
| 1,665,602 | Netherland | Apr. 10, 1928 |
| 1,739,267 | Sporer | Dec. 10, 1929 |
| 1,789,262 | Monso et al. | Jan. 13, 1931 |
| 1,880,658 | Baker | Oct. 4, 1932 |
| 1,984,164 | Stock | Dec. 11, 1934 |
| 2,076,158 | Reutter | Apr. 6, 1937 |
| 2,133,141 | Holm-Hansen | Oct. 11, 1938 |
| 2,144,681 | Kraissl | Jan. 24, 1939 |
| 2,151,792 | Meyers | Mar. 28, 1939 |
| 2,219,567 | Spielman | Oct. 29, 1940 |
| 2,266,475 | Ramsey | Dec. 16, 1941 |

FOREIGN PATENTS

| | | |
|---|---|---|
| 273,763 | Great Britain | July 2, 1927 |